United States Patent [19]  [11] 4,110,286
Vandegaer et al.  [45] Aug. 29, 1978

[54] STABLE POLYURETHANE LATICES, EMULSIFIABLE PREPOLYMERS THEREFOR AND METHODS OF MAKING THE SAME

[75] Inventors: Jan E. Vandegaer, Pasadena; John W. Calentine, Glen Burnie, both of Md.

[73] Assignee: Alcolac Inc., Baltimore, Md.

[21] Appl. No.: 766,257

[22] Filed: Feb. 7, 1977

[51] Int. Cl.$^2$ .................. C08L 75/12; C08G 18/32
[52] U.S. Cl. .................. 260/29.2 TN; 528/49
[58] Field of Search .................. 260/77.5 Q, 29.2 TN

[56] References Cited

U.S. PATENT DOCUMENTS

| | | | |
|---|---|---|---|
| 2,968,575 | 1/1961 | Mallonee | 260/29.2 TN |
| 3,294,752 | 12/1966 | Wilkinson | 260/77.5 Q |
| 3,388,087 | 6/1968 | Dieterich et al. | 260/77.5 Q |
| 3,535,274 | 10/1970 | Dieterich et al. | 260/29.2 TN |
| 4,011,871 | 3/1977 | Taft | 260/77.5 Q |

FOREIGN PATENT DOCUMENTS 1,158,088  7/1969  United Kingdom ............. 260/77.5 Q

*Primary Examiner*—H.S. Cockeram
*Attorney, Agent, or Firm*—George L. Tone

[57] ABSTRACT

Novel emulsifiable prepolymers for polyurethanes comprising an isocyanate prepolymer a minor proportion of the terminal isocyanate groups of which have been reacted with a quaternized tertiary amino alcohol, storage stable polyurethane latices produced therefrom and methods of making them are described. In a preferred embodiment a conventional isocyanate terminated prepolymer is first produced by the reaction of a polyol, preferably a diol of polyether or polyester origin, with a stoichiometric excess of a polyisocyanate, preferably a diisocyanate such as toluene diisocyanate; this prepolymer is then reacted, under anhydrous conditions, with a small amount, usually from about 1% to 5%, preferably about 1% to about 2%, by weight of a quaternized tertiary amino alcohol. Alternatively, a small amount of the quaternized tertiary amino alcohol may be included in the mixture of polyol and excess isocyanate used for making the prepolymer. In both cases there is obtained a prepolymer a minor proportion of the terminal isocyanate groups of which have been reacted through an urethane (carbamic ester) linkage with the quaternized tertiary amino alcohol. The thus obtained prepolymer is readily emulsifiable in water, without added surfactant type emulsifiers, whereby chain extension is effected by reaction of the free isocyanate groups of the prepolymer with the water, or an added diamine such as propylene diamine, to thereby produce storage stable, fully polymerized polyurethane latices useful, inter alia, for the production of films and coatings on a variety of both porous and non-porous substrates.

52 Claims, No Drawings

STABLE POLYURETHANE LATICES, EMULSIFIABLE PREPOLYMERS THEREFOR AND METHODS OF MAKING THE SAME

The present invention relates to a method of making polyurethane latices which are stable on storage.

BACKGROUND OF THE INVENTION

Polyurethanes first attained substantial commercial importance in the production of flexible and rigid foams. As late as 1968 it was estimated, Encyclopedia of Polymer Science and Technology, Interscience Division of John Wiley & Sons, Inc., New York (1969), Volume 11, pages 508, that of a total production in the United States of approximately 500 million pounds of finished polyurethane polymer, "The major portion of this market is still in flexible and rigid foams; comparatively speaking all other areas are still relatively small, consisting of five to ten percent of the total market." However during the time of major growth in the foam industry, other areas of use and application, including that of surface coatings, were investigated quite extensively and had appreciable growth. In the surface coating fluid, the commercial systems initially developed, in general, involved the use of either solvent-based, reactive high solids prepolymers or fully reacted urethane lacquers. The development of commercially acceptable polyurethane latices, of commercial significance, has largely occured since 1960 and a number of methods are presently used to produce polyurethane latices. The two most important methods, presently used, to produce polyurethane emulsions, are believed to be:

A. Direct Emulsification — where substantial amounts of surfactants are used to emulsify a prepolymer, with high speed agitation; and B. Emulsification by Salt Formation — where groups (usually secondary amino groups) are built into the prepolymer which are subsequently converted into salts having surfactant properties during emulsification.

Both of these techniques suffer from certain disadvantages. In the case of direct emulsification, it has been found necessary to use a substantial amount of surfactant, usually 4 – 6 parts of surfactant 100 parts of prepolymer, in order to obtain a stable emulsion and it has been suggested, the Applications of Synthetic Resin Emulsions by H. Warson, Ernest Benn, Ltd., London (1972), page 271, that in general such emulsions should be applied within 24 hours of preparation. When such emulsions (latices) are applied as a coating, the surfactant remains in the final film and results in increased water sensitivity of the film and reduced physical properties. The latices produced by the salt formation technique have particles of large size 2–5 microns or larger, with most of the particles being in the range of 2–3 microns, H. Warson, supra, page 270; with the result that the latices are not stable and a considerable percentage settles out of the latex on standing.

SUMMARY OF THE INVENTION

We have now found that if a small amount of a quaternized tertiary amino alcohol, of the type more fully described below, is reacted with, and thus chemically bound to, a minor proportion of the terminal isocyanate groups of an isocyanate terminated prepolymer obtained by the reaction of a stoichiometric excess of a polyisocyanate, usually and preferably a diisocyanate, with a polyol, usually and preferably a diol of polyether or polyester origin, so that a minor proportion of the terminal isocyanate groups of the prepolymer are "blocked" by such quaternized groups; the thus treated prepolymer is readily emulsified with water and yields, after chain extension by reaction of the remaining free isocyanate groups of the prepolymer with water and/or an added diamine, a stable, fully polymerized polyurethane latex having improved properties.

The process of the present invention, by which the novel improved latices thereof are produced, therefore, consists of first forming an isocyanate terminated prepolymer in a manner essentially the same as that commonly employed in the art for producing such prepolymers by the reaction of a stoichiometric excess of a suitable polyisocyanate with a suitable polyol, except that a minor proportion of the terminal isocyanate groups of the prepolymer are reacted with a quaternized tertiary amino alcohol, as described in detail below. The thus formed novel prepolymer, a minor proportion of the terminal isocyanate groups of which are thus "blocked" by quaternized tertiary amino groups, is then chain extended by emulsifying it in water with resultant chain extension by reaction between the free terminal isocyanate groups thereof with water and/or an added diamine, in the manner know in the art but without the addition of other emulsifying agents (surfactants), to yield the novel improved, stable, fully polymerized latices of this invention.

DETAILED DESCRIPTION OF THE INVENTION

Raw materials

A. Isocyanates

As indicated above the preferred isocyanates, used for the production of the polyurethane emulsions of this invention, are the commercially available toluene diisocyanates, i.e., tolylene 2,4-diisocyanate and commercially available mixtures thereof with tolylene 2,6-diisocyanate, i.e., a mixture of 65% tolylene 2,4-diisocyanate with 35% tolylene 2,6-diisocyanate and a mixture of 80% tolylene 2,4-diisocyanate with 20% tolylene 2,6-diisocyanate; there may also be used dianisidine diisocyanate; 3,3'-tolidene-4,4'-diisocyanate; diphenylmethane-4,4'-diisocyanate; 3,3'-dimethyldiphenylmethane-4,4'-diisocyanate; hexamethylenediisocyanate-2,4,4-(2,2,4-)trimethylhexamethylenediisocyanate; 3-isocyanato-methyl-3,5,5-trimethylcyclohexyl-isocyanate; 4,4'-dicyclohexylmethanediisocyanate; and m-xylylene-diisocyanate. As an example of a polyisocyanate may be mentioned the so-called "polymethylene polyphenyl isocyanate", a mixture of various high-boiling isocyanates derived from aniline and formaldehyde.

The isocyanates useful in practicing the present invention may be represented by the following general formula:

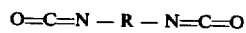

$$O=C=N - R - N=C=O \qquad \text{Formula 1.}$$

wherein, R represents an arylene group, an alkylene group (usually of from 2 to about 10 carbon atoms) or a cycloalkyl group; and such groups may contain such substituents as lower (1-4 carbon atoms) alkyl, lower alkoxy or halogen, e.g. chlorine or bromine. Suitable arylene groups include: phenylene, tolylene, xylylene, diphenylene, dimethyl- or dimethoxy-diphenylene, diphenylmethane, and dimethyl- or dimethoxydiphenylmethane; suitable alkylene groups include those of from 2 to about 10 carbon atoms, such as ethylene, butylene, isobutylene, n-hexylene, 2,4,4-trimethyl hexamethylene, 2,2,4-trimethyl hexamethylene, n-octylene, 2-ethyl-hexalene, n-decylene, etc.; suitable cycloalkyl groups are represented by cyclohexyl, 3,5,5-trimethyl cyclohexyl, and dicyclohexylmethane. When a polyisocyanate, such as a triisocyanate is to be used it will be understood that there may be an aryl isocyanate or an alkyl isocyanate substituent(s) on R.

B. Polyols

The polyols (diols, triols, tetrols, hexols, etc.) useful in practicing the present invention may be represented by the following general formula:

   Formula 2.

wherein, $R^1$ represents a divalent organic group, having its valence bonds on different carbon atoms, and may be alkylene, including hydroxy substituted alkylene groups, a polyether group or a polyester group, of the type more fully described below.

While useful polyurethanes may be obtained using such relatively simple and low molecular weight polyols as ethylene glycol; 1,2-propanediol; 1,3-propanediol; 1,2-butanediol; 1,3-butanediol; 1,4-butanediol; 1,6-hexanediol (hexamethylene glycol); 1,10-decanediol; glycerol; trimethylolpropane; 1,2,6-hexanetriol; pentaerythritol; sorbitol; mannitol; etc; higher molecular weight polyols, usually those having a molecular weight in the range of about 400 to 5,000, are generally preferred for the production of polyurethanes having the widest field of utility. Therefore, the oxyalkylation derivatives of such polyols as those mentioned above are usually preferred and are more fully described under "polyethers" in the immediately following paragraph. Another type of preferred polyol of high molecular weight, for a diol, are the hydroxyl terminated, liquid low molecular weight homopolymers of butadiene or copolymers thereof, e.g. styrene/butadiene or acrylonitrile/butadiene copolymers. Products of this type are commercially available from the ARCO/Chemical Company, division of Atlantic Richfield Company under the tradename "Poly bd Liquid Resins" R-45HT and R-45M which are hydroxyl terminated butadiene homopolymers having an average molecular weight of about 2,800, and CS-15 which is a hydroxyl terminated styrene-butadiene copolymer with an average molecular weight of about 3,400. Another commercially available type of polymeric diols are the hydroxyl terminated graft copolymers of polyether-polyols with approximately 20% by weight of acrylonitrile or mixtures of acrylonitrile and styrene available under the tradename "Polymer polyols" from Union Carbide Corporation and BASF-Wyandotte.

The type of polyols most widely used, at the present time, for the production of polyurethanes are polyethers, such as poly(oxytetramethylene) glycol derived from tetrahydrofuran and which may be represented by the formula $H(-O-CH_2-CH_2-CH_2-CH_2)_n-OH$; and the polyethers obtained by the condensation (oxyalkylation) of lower alkylene oxides, usually ethylene oxide, propylene oxide or butylene oxide, including mixtures thereof, on glycols, e.g. ethylene glycol or propylene glycol, as shown in the following equation:

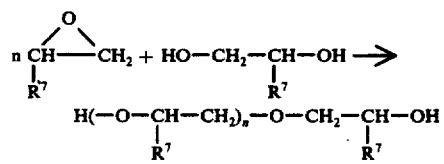  Eq. 1.

wherein $R^7$ represent hydrogen, methyl or ethyl, and $n$ represents the number of moles of alkylene oxide condensed with the glycol.

Triol type polyethers may be obtained by the oxyalkylation of such triols as glycerol, trimethylolpropane and 1,2,6-hexanetriol; tetrol type polyethers are produced by the oxyalkylation of a tetrol such as pentaerythritol or of an alkylene diamine such as ethylenediamine; while hexols may be obtained by the oxyalkylation of such materials as sorbitol and mannitol. A particularly preferred and widely used type of polyethers are the block copolymers prepared by first condensing propylene oxide with propylene glycol to form a poly(oxypropylene) glycol which is then reacted with ethylene oxide to form a block copolymer of structure represented by the following formula:

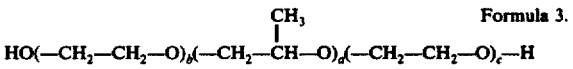  Formula 3.

and the analogous block copolymer triol, tetrol and hexol polyether type polyols. Such polyethers are commercially available in molecular weights of from about 150 to 5000 or somewhat higher and materials having a molecular weight in the range of about 400 to 4000 are most commonly used in the production of polyurethanes. A number of commercially available polyethers which may be used in practicing the present invention are listed in Table 1.

Table 1.

| Chemical identification | Commercially Available Polyethers | | | |
|---|---|---|---|---|
| | Type of Polyol | Trade name | Mol-wt range | Supplier |
| poly(oxypropylene)glycols | diols | Niax Diol | 400–4000 | Union Carbide Corp. |
| | | Pluracol P | 400–4000 | Wyandotte Chemicals Corp. |
| | | Voranol P | 2000 | Dow Chemical Co. |
| | | Poly-G | 400–2000 | Olin-Mathieson Corp. |
| | | PPG | 400–2000 | Jefferson Chemical Co. |
| | | Actol 21-56 | 2000 | Allied Chemical Corp. |
| | | Fomrez ED | 2000 | Witco Chemical Co. |
| poly(oxypropylene-b-oxyethylene)glycols(block copolymers) | diols | Pluronic | 1000–2800 | Wyandotte Chemicals Corp. |
| poly(oxypropylene)adducts of glycerol | triols | Niax Triol LG | 1000–3000 | Union Carbide Corp. |
| | | Pluracol GP | 3000 | Wyandotte Chemicals Corp. |
| | | Voranol GP | 2700–5000 | Dow Chemical Co. |
| | | Poly G | 1000–4000 | Olin-Mathieson Corp. |
| | | Triol G | 400–3000 | Jefferson Chemical Co. |
| | | Actol 31-56 | 3000 | Allied Chemical Corp. |
| | | Fomrez ET | 1500–3000 | Witco Chemical Co. |

Table 1.-continued

| | Commercially Available Polyethers | | | |
|---|---|---|---|---|
| Chemical identification | Type of Polyol | Trade name | Mol-wt range | Supplier |
| poly(oxypropylene) adducts of trimethylolpropane | triols | Pluracol TP | 300–4000 | Wyandotte Chemicals Corp. |
| poly(oxypropylene-b-oxyethylene) adduct of trimethylolpropane | triols | Pluracol TPE | 4500 | Wyandotte Chemicals Corp. |
| poly(oxypropylene) adducts of 1,2,6-hexanetriol | triols | Niax Triol LHT | 700–4400 | Union Carbide Corp. |
| poly(oxypropylene) adducts of pentaerythritol | tetrols | Pluracol PeP | 400–600 | Wyandotte Chemicals Corp. |
| poly(oxypropylene-b-oxyethylene) adducts of ethylenediamine (block copolymers) | tetrols | Tetronic | 1000–5000 | Wyandotte Chemicals Corp. |
| poly(oxypropylene) adducts of sorbitol | hexols | Niax Herol LS | 700 | Union Carbide Corp. |
| | | Pluracol SP | 500–700 | Wyandotte Chemicals Corp. |
| | | Atlas G | 500–5000 | Atlas Chemical Co. |

Polyester type polyols may also be used in practicing the present invention. Initially polyesters were the most commonly used type of polyol in the production of polyurethanes, but have been replaced to a large extent by the polyether type described above, largely on the basis of cost. For use in the production of polyurethanes, including use in the present invention, it is desirable that the polyester contain only hydroxyl groups as reactive sites; therefore, the preferred polyesters are those having very low acid numbers and very low water content. The most common monomers used in polyesters for polyurethanes are adipic acid, phthalic anhydride, ethylene glycol, propylene glycol, 1,3-butylene glycol, 1,4-butylene glycol, and diethylene glycol; where a branched chain polyester is desired, as in the production of crosslinked polyurethane, some or all of the glycol may be replaced by a triol, such as 1,2,6-hexanetriol, trimethylol propane, or trimethylolethane. Such polyester type polyols are commonly prepared by heating the glycol (and/or triol) in a reactor to 60°–90° C. The dicarboxylic acid is then added and the reaction mixture heated at such a rate that the water distills out rapidly. The ratio of acid to hydroxyl component is such that the hydroxyl is in excess, so that nearly all the acid groups are consumed and the polyester is prepared in the desired molecular-weight range, which is usually close to 2000. It is customary to force the reaction to completion by heating to about 200° C. while flushing with nitrogen or carbon dioxide under reduced pressure. Such polyesters as polycaprolactones may also be used.

Typical polyesters suitable for use in the present invention for the production of polyurethane emulsions having a range of applications are indicated in Table 2.

Table 2.

| Characteristics of Typical Polyesters | | | | | |
|---|---|---|---|---|---|
| Components | | | | Degree of | |
| Acid | Glycol | Triol | Hydroxyl no. | branching | Use |
| adipic | ethylene, propylene, or diethylene | none | 50–60 | none | elastomers |
| adipic or "dimer" acid | diethylene | glycerol or others | 50–65 | slight | flexible foams and coatings |
| adipic plus phthalic | ethylene or propylene | glycerol or others | 150–200 | moderate | semiflexible foams and coatings |
| adipic plus phthalic | ethylene or propylene | glycerol or others | 250–300 | high | rigid foam, chemically resistant coatings |
| adipic plus phthalic | ethylene or propylene | glycerol or others | 400–450 | very high | rigid foam, wire coatings |

C. Quaternized tertiary amino alcohols

The quaternized tertiary amino alcohols useful in practicing the present invention may be represented by the following general formula:

$$H-(O-CH-CH_2-)_n O-R^3-N^+ \begin{matrix} R^6 \\ R^4 \\ R^5 \end{matrix} \quad X^- \qquad \text{Formula 4.}$$
$$\overset{|}{R^7}$$

wherein $R^3$ represents an alkylene group of from 2 to about 10 carbon atoms;

$R^4$, $R^5$ and $R^6$, each of which may be the same or different, each represents alkyl of from 1 to about 12 carbon atoms, aryl (preferably phenyl), alkaryl (preferably benzyl) or the $R^5$ and $R^6$ on the nitrogen atom, taken together, may represent a divalent aliphatic group of 4 to 5 atoms which jointly with the amino nitrogen forms a five or six membered heterocyclic amino group such as pyrrolidinyl, piperidinyl, morpholino or thiamorpholino and these groups may have a lower alkyl substituent such as a methyl or ethyl group;

X represents an anion (forming the anionic portion of a quaternary ammonium group) such as a halogen ion (fluorine, chlorine, bromine or iodine), a sulfate ion (preferably a lower alkyl sulfate such as methyl or ethyl sulfate) a hydroxyl ion or a nitrate ion;

$R^7$ represents H, methyl or ethyl; and $n$ represents an integer, including 0, of from 0 to about 10.

Such quaternized tertiary amino alcohols may be produced by quaternizationof the corresponding tertiary amino alcohol, employing conventional quaternization techniques and quaternizing agents. In general it is preferred to use the mildest reaction conditions possible commensurate with a substantially quantitative yield within a reasonable reaction time. Temperatures within the range of 0° C. to the reflux temperature of the reaction mixture but usually not over 100° C, and preferably within the range of 20° to 60° C. may be used. The quaternization may be carried out in the present of a volatile solvent which is inert under the reaction conditions. Suitable solvents include, water, methanol, butanol, benzene, toluene, ethyl ether, chloroform, 2-butanone, acetone and the like. The preferred quaternizing agents are the lower alkyl halides or di-lower alkyl sulfates. Specific quaternizing agents which may be used include: methyl chloride, methyl bromide, methyl iodide, ethyl chloride, ethyl bromide, ethyl iodide, n-propyl bromide, n-propyl chloride, n-propyl iodide, isopropyl chloride, isopropyl bromide, n-butyl chloride, n-butyl bromide, sec.-butyl bromide, n-amyl bromide, n-hexyl chloride, benzyl chloride, dimethyl sulfate and diethyl sulfate.

As examples of suitable tertiary amino alcohols, whose quaternization products may be used in practicing the present invention, may be mentioned such N-dialkylamino alkanols as 2-dimethylaminoethanol, 2-diethylaminoethanol, 2-ethyl-2-benzylaminoethanol, 2-dioctylaminoethanol, 2-methyl-2-octylaminoethanol, 2-methyl-2-dodecylaminoethanol, also N-dimethylaminopropanol-3, N-diethylaminobutanol-4, N-dimethylaminodecanol-10, N-dimethylaminoeicosanol-20; also such N-benzyl-N-alkylalkanols as N-ethyl-N-benzylaminoethanol, N-methyl-N-benzylaminobutanol-4, N-dodecyl-N-benzylaminoethanol; also such N-alkyl-N-ωhydroxyalkylanilines as: N-methyl-N-βhydroxyethyl aniline, N-ethyl-N-βhydroxyethyl aniline, and N-methyl-N-hydroxypropyl aniline and N-βhydroxyethyl diphenylamine. As examples of tertiary heterocyclic amino alcohols may be mentioned β-hydroxyethylpiperidine, β-hydroxyethylpyrrolidine and 4-(β-hydroxyethyl)morpholine.

A preferred type of quaternized tertiary amino alcohols are the quaternized derivatives of tertiary amino alcohols which contain a polyglycol ether group in their molecular structure; i.e., products of Formula 4 above wherein n is an integer of 1 or more, usually an integer of from 1 to 10. Suitable tertiary amino alcohols of this type are the alkylene oxide adducts of any of the tertiary amino alcohols named in the immediately preceding paragraph; which are produced when one or more molar proportions of and alkylene oxide such as ethylene oxide, propylene oxide or butylene oxide are condensed with, and thus added onto, one molar proportion of such tertiary amino alcohols in the manner well known in the art. This type of quaternized tertiary amino alcohols, wherein $R^3$, in Formula 4 is a

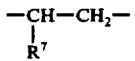

group, may also be produced by the quaternization of an alkylene oxide adduct of a secondary amine obtained in the manner known in the art and illustrated in the following equation:

Eq. 2.

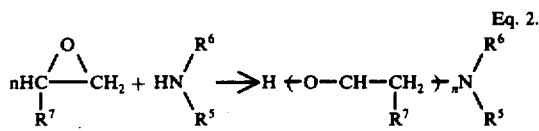

wherein $R^5$, $R^6$, $R^7$ and n are as defined above. As examples of suitable secondary amines, whose alkylene oxide adducts may be quaternized for use in the present invention, may be mentioned: dimethylamine, diethylamine, dibutylamine, dioctylamine, N-methyl-N-octylamine, N-ethyl-N-decylamine, N-methyl-N-octadecyl-amine and such commercially available secondary higher fatty amines as Adogen 240 (bishydrogenated tallow amine) available frm Archer Daniels Midland Co., Minneapolis, Minn.; Armeen 2C available from Armour Industrial Chemical Co., Chicago, Ill.; and Alamine 204, 205, 206, 207, 215, 221 and H226 available from General Mills, Chemical Div., Kankakee, Ill.

D. Chain Extending Agents

As is common in the polyurethane art, the novel prepolymers of the present invention may be chain extended to fully reacted polyurethanes by emulsifying them in water and effecting chain extension by reaction between the water and the terminal isocyanate groups of the prepolymer; however, as is well known in the polyurethane art, various chain extending agents may be added to the emulsion, in amounts of from 1 to 100% equivalents of the isocyanate in the prepolymer, so that some or all of the chain extension is effected by reaction between the terminal isocyanate groups of the prepolymer and the added chain extending agent. Our preferred chain extending agents are diamines; such as hydrazine, alkylene diamines such as ethylene diamine or propane diamine,arylene diamines such as p-phenylene diamine or 4,4′diaminodiphenylmethane, or cyclic diamines such as piperazine.

Production of Prepolymers

In practicing the present invention we have found that the quaternized tertiary amino alcohol should be bound into, reacted with, the polyurethane prepolymer structure prior to the emulsification of the prepolymer in water, with resultant chain extension. Thus, in practicing the present invention there is first formed a prepolymer consisting essentially of a mixture of a major proportion of a predominantly isocyanate terminated prepolymer, of the type commonly formed in the prior art, which may be represented by the formula:

Formula 5.

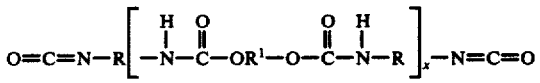

and a minor amount of a prepolymer in which one of the terminal isocyanate groups of the above has been reacted with a quaternized tertiary amino alcohol so as to give a prepolymer which may be represented by the formula:

Formula 6.

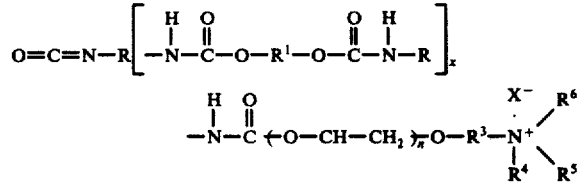

wherein
R, $R^1$, $R^3$, $R^4$, $R^5$, $R^6$, $F^7$ and n are as defined in Formulas 1, 2 and 4 above, and x is an integer.

This can be accomplished in several ways. If desired, a polyurethane isocyanate terminated prepolymer may first be formed in the conventional manner as by reacting, under anhydrous conditions, a mixture of a stoichiometric excess of a diisocyanate, such as toluene diisocyanate, with a diol, such as polytetrahydrofuran, so as to form an isocyanate polyurethane prepolymer, of the structure illustrated in Formula 5 above. Conventional conditions may be employed for effecting such reaction; and as is known in the art the specific conditions employed will vary depending, inter alia, on the particular diisocyanate being used, the particular polyol being used (especially its type, ester, ether etc. and its molecular weight). Thus the temperature of reaction may vary from 25° C. to about 110° C., and is usually selected so as to give the desired reaction in a reasonable time; with temperatures at the lower end of this range being employed when a relatively highly reactive diisocyanate is used, and where there may be sufficient exotherm that no heating is needed, while temperatures at the upper end of the range will be used when less reactive materials are being used and in this case it may be advantageous to employ known catalysts for the reaction. Temperatures above about 110° C. are preferably avoided since substantial amounts of allophonates may be formed above this temperature. A rather widely applicable and thus preferred temperature range is from about 65° to about 95° C. As stated above, the diisocyanate is used in stoichiometric excess, and the particular molar proportions of the diisocyanate and polyol are usually selected to as to give a prepolymer having a predetermined free isocyanate content. We have found that prepolymers have a free isocyanate content in the range of from about 1.2% to about 9% are acceptable for use in practicing the present invention; in general the preferred free isocyanate content of the prepolymer varies inversely with its molecular weight so that prepolymers having a molecular weight of about 7,000 or higher would be those prepared having a free socyanate content of the order of 1.2%, while prepolymers having molecular weight of about 1,000 would be those prepared having a free isocyanate content of the order of 9%. A relatively widely applicable, and thus preferred, range of free isocyanate content is from about 3% to about 6%.

A small amount quaternized tertiary amino alcohol is then added to the thus formed prepolymer and the mixture heated, for several hours, under anhydrous conditions, usually and preferably at a temperature of about 70°-80° C., although temperatures in the range of 25°-110° C. may be used, until the quaternized tertiary amino alcohol has reacted with some of the free isocyanate groups of the prepolymer so that a minor amount of prepolymer of Formula 6 has been formed. Alternatively, the quaternized tertiary amino alcohol may be reacted into the prepolymer during the formation of the prepolymer, by including a minor amount of a quaternized tertiary amino alcohol in the mixture of diisocyanate and diol used for producing the prepolymer. It is also feasible to first react the diisocyanate, to be used in making the prepolymer, with a minor amount of the quaternized tertiary amino alcohol so as to form a mixture of unaltered diisocyanate and isocyanate having one of its isocyanate groups blocked by the quaternized tertiary amino alcohol; i.e., a product of the formula:

Formula 7.

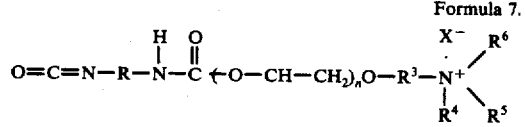

Wherein R, R³, R⁴, R⁵, R⁶ and n are as defined above; and use such a mixture in making the prepolymer. In this case either the total amount of diisocyanate to be used may be reacted with the total amount of quaternized tertiary amino alcohol to be used, so as to form a mixture of unaltered and partially blocked diisocyanate which may be used directly in making the prepolymer; or, if desired, a more concentrated mixture containing a major, or substantial, amount of the partially blocked diisocyanate, and which thus contains substantially more of the partially blocked diisocyanate than is desired, may be formed, as by using a stoichiometric excess of diisocyanate, say 1.5–2 moles of the diisocyanate per 1 mole of the quaternized tertiary amino alcohol, so as to form a concentrated mixture of the mono carbamic ester of the diisocyanate with the quaternized amino alcohol and unreacted diisocyanate, and this concentrated mixture then be mixed with additional diisocyanate to give a mixture containing the desired amount of partially blocked diisocyanate for use in forming the prepolymer.

Regardless of how the quaternized tertiary amino alcohol is reacted into the prepolymer; the total amount which is used should constitute from about 1% to about 5% of the total weight of diisocyanate and diol used in making the prepolymer; with about 1% to about 2% constituting a preferred range.

While the quaternized tertiary amino alcohols, per se, are not effective emulsifiers; we have found that the above described reaction products thereof, of Formula 6, with isocyanate terminated prepolymers are very effective emulsifiers for the prepolymers. These products, of Formula 6, may be considered as mono-carbamic acid esters of the quaternized tertiary amino alcohol with the isocyanate terminated prepolymer, of which the quaternized tertiary amino alcohol moiety constitutes the hydrophilic moiety of an emulsifying agent and the prepolymer moiety of which constitutes the hydrophobic moiety of an emulsifying agent.

Formation of Latices

The thus obtained prepolymer, consisting of a mixture of a major amount of isocyanate terminated prepolymers of Formula 5, above, and a minor amount of "quaternized" prepolymers of Formula 6, above, is then emulsified with water by high speed mixing. As is common in the art of emulsification of "conventional" isocyanate terminated prepolymers, the mixture of "conventional" prepolymers and "quaternized" prepolymers of the present invention usually is diluted with an inert volatile solvent prior to emulsification, in order to facilitate handling. Toluene is a preferred solvent, although other inert volatile solvents for the prepolymers, such as: xylene, heptane, ethyl benzene and the like may be used. The amount of such solvent-diluent to be used will vary with the particular prepolymer to be emulsified and the desired solids content of the final latex, but ordinarily an amount of such solvent-diluent equal to at least one-third the weight of the prepolymer is used; the optimum amount of such solvent-diluent for any particular prepolymer and desired final latex can be determined by preliminary test. Such dilution of the prepolymer with toluene (or other inert volatile solvent) is readily effected by stirring the prepolymer into the solvent. The diluted prepolymer is then emulsified in water by high speed stirring; and the thus formed emulsion is then aged to effect chain extension, in the manner known in the art, by reaction between the water and some of the terminal isocyanate groups of the prepolymer whereby carbon dioxide is released and the reacting isocyanate groups converted to primary amino groups, as illustrated in Equation 3A, below; the thus formed terminal amino groups then react with a free terminal isocyanate isocyanate group on another molecule of the prepolymer, with the formation of an ureido group, whereby chain extension is effected, as illustrated in Equation 6B:

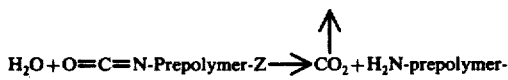

Eq. 6A.

$$H_2O + O=C=N\text{-Prepolymer-Z} \rightarrow CO_2 + H_2N\text{-prepolymer-Z}$$

Eq. 6B.

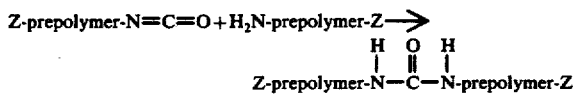

Z in the above equations represents an isocyanate group, in the case of "conventional" prepolymer molecules of Formula 5; or a carbamyl ester group, in the case of "quaternized" prepolymer molecules of Formula 6. It will be apparent that chain extension will continue, in this manner, through the free isocyanate groups at both ends of the "conventional" prepolymer molecules, or the free isocyanate group at one end of the "quaternized" prepolymer molecules, until a fully reacted polyurethane is obtained in the form of a stable latex. While chain extension occurs at only one end of the "quaternized" prepolymer molecules, we have not noticed any appreciable adverse effect (lowering) on the molecular weight of the final polurethane. It is also possible to somewhat expedite chain extension, in the manner frequently used in the known "Direct Emulsification" processes for producing polyurethane latices, by incorporating a small amount of a diamine, e.g. hydrazine, or an alkylene, arylene or cyclic diamine such as propylene diamine, p-phenylene diamine or piperazine in the emulsion; whereby chain extension is effected by reaction between the terminal amino groups of the diamine and the terminal isocyanate groups of the prepolymer to form ureido linking groups in a manner analogous to that illustrated in Equation 6B.

The specific details of the present invention will be apparent to those skilled in the art from a consideration of the following specific examples of certain preferred embodiments thereof.

The methyl chloride quaternary of diethylaminoethoxyethanol,

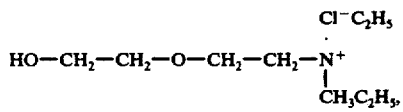

used in Examples 1–4 and 6–10, and sometimes hereinafter referred to as "Quat. 1", was prepared as follows:

2,102 grams (13.05 moles) of diethylaminoethoxyethanol and 2,761 grams of methanol were charged to a 2 gallon autoclave. 792 grams (15.68 moles) of methyl chloride were added over 60 minutes at 50° to 67° C. The reaction was then conducted at 55° to 65° C. for 7 hours 55 minutes. After completion of the reaction, the solvent methanol and unreacted methyl chloride were removed at 25 inches vacuum and 60° C. and the liquid product resulting analyzed as follows:

|  | Theory | Found |
|---|---|---|
| Inorganic Chloride | 4.75 meq/g. | 4.41 meq/g. |
| Free amine | — | none |
| H₂O | — | 0.40% |

The methyl chloride quaternary of N,N-dibutyl ethanolamine used in Example 5 was prepared as follows:

304 g. (1.75 moles) of dibutylaminoethanol and 884 g. of acetone were charged to a 2 liter autoclave. 127.5 g. (2.52 moles) of methyl chloride were added over 17 minutes at 50° C. The reaction was then conducted at 50° C. for 6¼ hours. The reaction mixture was one phase. On completion of the reaction, the acetone and unreacted methyl chloride were removed under vacuum. The product, a viscous liquid analyzed as follows:

|  | Theory | Found |
|---|---|---|
| Inorganic Chloride | 4.39 meq/g. | 4.39 meq/g. |
| Free amine | — | .021 meq/g. |
| H₂O | — | 1.81% |

Prior to use the quaternary should be dried as by placing it in a beaker in a vacuum oven at about 100° C. for an hour; or if it is to be reacted with the prepolymer during the formation of the prepolymer it may be dissolved in the polyol to be used and the solution of these dried in a similar manner.

EXAMPLE 1

Part A: Preparation of Prepolymer 1,000 grams (1 mole) of the polyether, polytetrahydrofuran (molecular weight 1,000) (POLY MEG -1000) were weighed into a 2 liter beaker and placed in a vacuum oven for 1 hour at 100° C. to remove traces of water. 294 grams (1.69 moles) of toluene diisocyanate (65% tolylene 2,4-diisocyanate, 35% tolylene 2,6-diisocyanate) were then stirred into the dry POLY MEG-1000 under a nitrogen atmosphere to prepare a uniform solution. The thus prepared solution was then split into two substantially equal portions which were placed in quart jars under nitrogen. The quart jars containing the POLY MEG-1000 and TDI solution were then placed in an oven and heated at 75° C. for two hours to form the prepolymer. The isocyanate content of the thus obtained solution, prepolymer (determined in the manner described by Wright, P. and Cumming, A.P.C. in Solid Polyurethane Elastomers, "Analytical Procedures" pp. 84–86; MacLaren and Sons, London, 1969) was found to be 4.2%, while the theoretical was 4.4%. The thus prepared prepolymer is hereinafter referred to as "prepolymer 1-A".

Part B: Reaction of prepolymer with quaternized tertiary amino alcohol.

500 grams of prepolymer 1-A were charged to a 1 liter flat bottom flask and 10 grams of Quat.-1 (Methyl chloride quaternary of diethylaminoethoxyethanol) added thereto while stirring under nitrogen until a uniform solution was obtained. The flask was then stoppered, placed in an oven and heated for 2 hours at 75° C. to effect reaction of the quaternary with some of the isocyanate groups of the prepolymer. The thus modified prepolymer is hereinafter referred to as "quaternized prepolymer 1-A".

Part C: Preparation of latex.

100 grams of quaternized prepolymer 1-A, obtained as described in Part B, was diluted with toluene by stirring it into 100 grams of toluene in a beaker until a uniform solution was obtained. The thus obtained solution was then stirred into 180 grams of water (deionized) and the mixture then poured into a Waring Blendor where emulsification was effected by mixing at high speed for 10 minutes. The latex was then aged 24 hours to allow reaction of the excess isocyanate groups with water, thereby achieving chain extension to a polyurethane. The latex was then filtered with approximately 0.1 g. of coagulum being removed. The filtered latex was stable, with no evidence of coagulation or settling, after storage for over two months at ambient temperatures in a wide mouth bottle.

EXAMPLE 2

Part A: Preparation of "quaternized" prepolymer 1,000 g. (1 mole) of POLY MEG-1000 were weighed into a 2 liter beaker and placed in a vacuum oven for 1 hour at 100° C. to remove traces of water. 315 g. (1.81 moles) of toluene diisocyanate (65% tolylene 2,4-diisocyanate, 35% tolylene, 2,6-diisocyanate) were the stirred into the dry POLY MEG-1000 under a nitrogen atmosphere to prepare a uniform solution. 27 grams (approx. 2% by weight) of Quat.-1 were then stirred into the thus prepared solution, under nitrogen. The thus prepared solution was then poured, in approximately equal portions, into two quart jars, under nitrogen. These quart jars were placed in an oven and heated at 75° C. for two hours to thereby form a "quaternized" prepolymer. The isocyanate content of the thus obtained prepolymer was 4.5% while theoretical was 4.65%. The thus obtained prepolymer is hereinafter referred to as "quaternized" prepolymer 2-A.

Part B: Preparation of latex

Using the procedure described in Part C of Example 1, a latex was prepared from said quaternized prepolymer 2-A as follows: 100 grams of quaternized prepolymer 2-A was diluted with toluene by stirring it into 100 grams of toluene in a beaker until a uniform solution was obtained. The thus obtained solution was then stirred into 180 grams of water (deionized) and this mixture was then poured into a Waring Blendor where emulsification was effected by mixing at high speed for 10 minutes. The latex was then aged 24 hours to allow reaction of the excess isocyanate groups with water thereby achieving chain extension to a fully polymerized polyurethane. The latex was then filtered with approximately 0.1 g. of coagulum being removed. The filtered latex was stable after storage for over two months in a wide mouth bottle at ambient temperatures. The thus obtained latex in hereinafter referred to as "Latex 2-B".

EXAMPLE 3

The procedure of Example 1, Parts B and C, was repeated in a series of three experiments in which the only change made was in Part B where 100 grams of prepolymer 1-A was used in each of these experiments, and the amount of Quat.-1 added thereto was varied in each of these experiments; 1 gram (1% by weight) of Quat.1 being used in one experiment; 2.8 grams (2.8% by weight) being used in a second experiment and 5.5 grams (5.5% by weight) being used in a third experiment, as compared with the 2% by weight of such Quat.-1 used in Part B of Example 1. Stable latices were prepared, in the same manner as described in Part C of Example 1, from each of the thus obtained "quaternized" prepolymers, but no advantage was apparent in using more than 2% by weight of the quaternized tertiary amino alcohol (Quat.1) as was done in Example 1. The latex produced from the prepolymer made in the experiment in which 1% of Quat. 1 was used is hereinafter referred to as "Latex 3-A"; that produced from the prepolymer made in the experiment in which 2.8% of Quat.-1 was used is referred to as "Latex 3-B"; while the latex produced from the prepolymer made in the experiment in which 5.5% of Quat.-1 was used is referred to as "Latex 3-C".

Films were formed from the stable latices produced in the foregoing Examples 1, 2 and 3 in the following manner: A Bird Film Applicator (3½ inch width and 3 mil clearance for wet film thickness) was used to place a uniform latex wet film on a glass plate. The latex film was allowed to air dry at room temperature, and the dry film then stripped from the plate.

The films prepared from latices 1-C, 2-B and 3-A were essentially similar and no material differences were noted between them, all of these films were water clear, elastic and had the highest tensile strength of those tested. The films prepared from latices 3-B and 3-C were essentially similar to each other and were of acceptable quality, but were slightly hazy and were somewhat less elastic and had a slightly lower tensile strength than the films from latices 1-C, 2-B, and 3-A. The films from latices 3-B and 3-C were essentially similar to the films obtained from polyurethane latices made by conventional "direct emulsification" technique and using 4–6% of conventional surfactant type emulsifiers, e.g. sodium tridecyl ether sulfate (an anionic surfactant), Ethoquad C-25 — the methyl chloride quaternary ammonium salt of a polyethoxylated amine derived from coco fatty acid and having the formula:

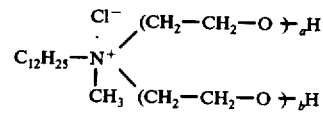

wherein, $a+b=15$ (cationic sulfactant), and a 3:1 mixture of polyethoxylated fatty alcohols (a nonionic surfactant) and Ethoquad C-25 (a cationic surfactant).

EXAMPLE 4 (COMPARATIVE)

As stated above, we have found that the quaternized tertiary amino alcohol should be reacted with, and thus bound into, the prepolymer structure prior to its emulsification in water. This was confirmed in the following experiment in which an effort was made to simultaneously emulsify the prepolymer and react a portion of the terminal isocyanate groups thereof with a quaternized tertiary amino alcohol. In this experiment:

100 grams of prepolymer 1-A, prepared as in Example 1, Part A, was diluted with toluene by stirring it into 100 grams of toluene in a beaker until a uniform solution was obtained. The thus obtained solution was then stirred into a solution of 2 grams of Quat.-1 (methyl chloride quaternary of diethylaminoethoxyethanol) in 180 grams of deionized water. The thus obtained mixture was then poured into a Waring Blendor and emulsified by mixing high speed for 10 minutes. The emulsion solidified during preparation and no latex or other useful product was obtained.

EXAMPLE 5

| Recipe: Materials | Equivalents | Wt. in grams |
|---|---|---|
| POLY MEG 1000 | 1.01 | 500. |
| Toluene diisocyanate | 1.80 | 157. |
| Methyl chloride quaternary of N,N-Dibutyl Ethanolamine | .03 | 6.75 |
| | Total | 663.75 |

Procedure:
A.-The POLY MEG 1000 was weighed into a 1 liter beaker and placed in a
vacuum oven for 1 hour at 100° C. to remove traces of water.
B.-The Toluene diisocyanate and the quaternary were then stirred into
the dry POLY MEG 1000 under a nitrogen atmosphere.
C.-When a uniform solution had been prepared, the material was placed in a quart jar under nitrogen.
D.-The materials were heated at 75° C. ± 5° in an oven until the free isocyanate content had level had dropped to 4.5% ± 0.2%.
E.-A latex was prepared by first diluting a 100 g. portion of the thus prepared prepolymer with 50 g. toluene and then emulsifying in 180 g. deionized water using vigorous agitation. The thus obtained latex was still stable after over 60 days storage.

EXAMPLE 6

| Recipe: Materials | Equivalents | Wt. in grams |
|---|---|---|
| POLY MEG 1000 | 0.67 | 333. |
| Toluene diisocyanate | 1.20 | 104. |
| Methyl chloride quaternary of diethylaminoethoxyethanol-Quat. | 0.03 | 6.4 |
| | Total | 443.4 |

Procedure:
A.-The dry POLY MEG 1000 was weighed into a liter container. The quaternary was dispersed in the POLY MEG 1000, then the toluene diisocyanate was stirred into the solution under a nitrogen atmosphere.
B.-An exothermic reaction set in and was allowed to procede at 24° C. for 2 hours at which time the isocyanate content was 4.5%. No heat was used to complete the reaction.
C.-A latex was prepared by first diluting a 100 g. portion of the thus prepared prepolymer with 50 g. of toluene and then emulsifying in 180 g. deionized water using a Waring Blendor at high speed for 2 minutes. 95% of the theoretical amount of piperazine needed for chain extension was then added to the emulsion with fairly vigorous agitation. The resultant latex was stable with no coagulum.

The above experiment was repeated except that in part C 60% of the theoretical amount of piperazine needed for chain extension was added to the emulsion. A stable latex was obtained.

EXAMPLE 7

-A-

A stable latex was prepared as described in Example 6 A, B and C.

Toluene was then stripped from the thus prepared latex by heating to 60° C. under vacuum (about 25 inches) until 85% of the toluene had been removed. The thus obtained stripped latex was stable on storage.

-B-

A stable latex was prepared in the manner described in Example 2, Part B by emulsifying together in a Waring Blendor for 10 minutes, 100 g. of prepolymer (prepared as in Example 2, Part A), 50 g. of toluene and 100 g. of deionized water. Toluene was then stripped from the thus prepared stable latex by heating to about 60° C. under vacuum until about 85% of the toluene had been removed. There was thus obtained a stable emulsion having a solids content of over 50%.

EXAMPLE 8

| Recipe: Materials | Equivalents | Wt. in grams |
|---|---|---|
| POLY MEG 1000 | 0.65 | 324. |
| Isophorone diisocyanate | 1.17 | 130. |
| Methyl chloride quaternary of diethylaminoethoxyethanol-Quat.-1 | .03 | 6.8 |
| | Total | 460.8 |

Procedure:
A.-Dry POLY MEG 1000 was weighed into a quart jar. The isophorone diisocyanate (3-isocyanato-methyl-3,5,5-trimethylcyclohexyl isocyanate), Scholven Chemie AG, and the quaternary were stirred into the POLY MEG 1000 under a nitrogen atmosphere.
B.-To the thus obtained solution there was added 4 drops of NIAX Catalyst D-22 (dibutyl tin dilaurate) with stirring.
C.-The solution was then heated in an oven at 80° C. until the isocyanate level reached 4.3% ± 0.1%.
D.-A latex was prepared by first diluting a 100 g. portion of the thus prepared prepolymer with 50 g. toluene and then emulsifying in 180 g. deionized water using vigorous agitation. The thus obtained latex was stable after 90 days storage.

EXAMPLE 9

| Recipe: Materials | Equivalents | Wt. in grams |
|---|---|---|
| POLY MEG 1000 | 0.65 | 324. |
| 4,4'-dicyclohexylmethane diisocyanate | 1.17 | 154. |
| Methyl chloride quaternary of diethylaminoetoxyethanol-Quat. 1 | .03 | 7.1 |
| | Total | 485.1 |

Procedure:
A.-Dry POLY MEG 1000 was weighed into a quart jar. The 4,4'-dicyclohexylmethane diisocyanate (Hylene W. duPont) and the quaternary were stirred into the POLY MEG 1000 under a nitrogen atmosphere.
B.-To the thus prepared solution there was added, with stirring 4 drops of NIAX Catalyst D-22.
C.-The solution was then heated in an oven at 80° C. until the isocyanate content reached a 4.3% ± 0.1% level.
D.-A latex was prepared by first diluting a 100 g. portion of the thus prepared prepolymer with 50 g. of toluene and then emulsifying in 180 g. of deionized water using vigorous agitation. The thus obtained latex was stable after 90 days storage.

EXAMPLE 10

| Recipe: Materials | Equivalents | Wt. in grams |
|---|---|---|
| NIAX Polyol PPG-1025 | 1.33 | 650.2 |
| Tolune diisocyanate | 2.39 | 208.0 |
| Methyl chloride quaternary of diethylaminoethoxyethanol-Quat.-1 | 0.04 | 9.0 |
| | Total | 861.2 |

Procedure:
A.-The dry NIAX Polyol PPG-1025 (a polyoxypropylene diol designed for use as
urethane polymer intermediate, Union Carbide Corp.) was charged to a 1.5 liter reactor, then the quaternary was stirred in while maintaining a nitrogen blanket.
B.-After the quaternary was thoroughly blended into the NIAX Polyol PPG-1025,
the toluene diisocyanate was blended into the solution.
C.-To the solution was added NIAX Catalyst D-22 (6 drops) and the reactor temperature was raised to 45-50° C.
D.-The reaction was continued, at 45-50° C., until an isocyanate content of 4.7% ± 0.2% was obtained, approximately 4 hours.
E.-A latex was prepared by first diluting a 100 g. portion of the thus prepared prepolymer with 50 g. of toluene, then emulsifying in 180 g. of deionized water using high speed mixing in a Waring Blendor for 2 minutes. A stable latex was thus obtained.

EXAMPLE 11

| Recipe: Materials | Equivalents | Wt. in grams |
|---|---|---|
| POLY MEG 1000 | 1.60 | 800. |
| Toluene diisocyanate | 2.85 | 248. |
| Methyl chloride quaternary of diethylaminoethoxyethanol-Quat.-1 | .06 | 16. |
| Total | | 1064.0 |

Procedure:
A.-Dry POLY MEG 1000 was weighed into a 2 liter container. The toluene diisocyanate and the quaternary were then stirred into the dry POLY MEG 1000 under a nitrogen atmosphere.
B.-The container was heated approximately 2 hours at 80° C., nitrogen atmosphere, to reduce the isocyanate content to 4.2% ± 0.1%.
C.-A 400 g. portion of the thus prepared prepolymer was diluted with 400 g. of toluene and then the diluted solution was mixed into 810 g. of deionized water using a Cowles Dissolver and mixing for 20 minutes at 5400 rpm. The thus obtained latex was still stable after 4 months storage.

It will be understood that the forgoing Examples 1-3 and 4-11 are illustrative only of certain preferred embodiments of this invention and various modifications and changes therein will suggest themselves to those skilled in the art and may be made without departing from the spirit of the invention or the scope of the appended claims.

Thus, in order to simplify the description of the present invention, it has been described with particular reference to the preparation of stable latices of polyurethanes made by the reaction of a diisocyanate, and more specifically toluene diisocyanate, with a diol, and more specifically a diol of polyether origin; which are most generally used for the production of polyurethane elastomers, a type of product for which the present invention is particularly valuable. However, it will be understood the present invention is applicable to the production of stable latices of polyurethanes having varying degrees of cross-linking in their structure; such as those obtained when the diisocyanate is replaced, in whole or in part, by a triisocyanate, and/or the diol is replaced, in whole or in part, by various triols, tetrols hexols, etc. used in the production of flexible to rigid crosslinked polyurethanes. A number of specific commercially available polyols and polyisocyanates, used in making polyurethanes, and which are useful in practicing the present invention have been disclosed above and this disclosure, therefore, is not repeated here. It may be said that isocyanate or polyol to be used in the production of the stable latices of this invention does not, per se, form a part of this invention, but will be determined primarily on the basis of such factors as the specific properties desired in the final polyurethane and economics, rather than any unique requirements of this invention with regard thereto.

The particular tertiary amino alcohol used in the production of the "quaternized" prepolymer is not critical so long as it is compatible (soluble or readily dispersible in) the particular prepolymer with which it is used when reacted with a preformed "conventional" prepolymer in the manner described in Example 1, or one of the components, polyol or diisocyanate, of the prepolymer when it is reacted into the prepolymer in the course of its production as described in Example 2. However, one of the advantages of the present invention is that only relatively small amounts, 1–2% by weight, of the quaternized tertiary amino alcohol need be used. Thus, in making a stable polyurethane latex following the procedure described in Example 2, but replacing the polytetrahydrofuran (POLY MEG-1000) used in the Example with an equivalent amount of a poly(oxypropylene)glycol having a molecular weight of 1025 (NIAX Polyol PPG-1025), we found that the specific quaternized tertiary amino alcohol used, the methyl chloride quaternary of diethylaminoethoxyethanol (Quat. 1), was considerably less soluble in the NIAX Polyol PPG-1025 than it had been in the POLY MEG-1000; however, at the small amount thereof used this did not present a problem. In cases where such lack of compatibility does present a problem with respect to any specific quaternized tertiary amino alcohol, it can be overcome by careful selection of the particular tertiary amino alcohol and/or quaternizing agent to be used.

As indicated in the preceding paragraph, one of the principal advantages of the present invention, vis-a-vis the known direct emulsification processes in which surfactant type emulsifiers are used, is that substantially less of the tertiary amino alcohol is required. The preformed cationic groups which are bound into the prepolymer in the present invention, and which remain bound into the final fully polymerized polyurethane following chain extension, impart to the prepolymer excellent emulsifying properties and in the case of the final latex impart to it excellent stability. All of the cationic groups are attached to the prepolymer or ultimately the final fully polymerized polyurethane and in this form less are needed and more efficient usage of surfactant is obtained. The cationic groups, being chemically bound to the polyurethane, have the further advantage of being non-extractable and being cationic have the further advantage of improving bonding or promoting adhesion of the polyurethane to anionic substrates, such as textiles.

The stable polyurethane latices of the present invention are particularly useful for the coating or impregnation of porous materials, such as textiles, paper and leather, but are also useful for the coating of nonporous materials such as metals, wood and glass. They are also useful as resin binders and adhesives.

We claim:

1. In a process for preparing a polyurethane prepolymer wherein a reaction mixture consisting essentially of a mixture of (i) a stoichiometric excess of a polyisocyanate and (ii) a polyol are reacted under anhydrous conditions to form an isocyanate terminated prepolymer; the improvement which comprises incorporating into said reaction mixture, at any time while it is under anhydrous conditions, a small amount equivalent to from about 1% to about 5% by weight of the total weight of said polyisocyanate and said polyol of a quaternized tertiary amino alcohol of the formula:

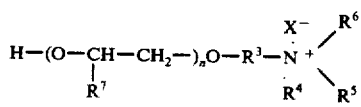

wherein $R^3$ represents an alkylene group of from 2 to about 10 carbon atoms;

$R^4$, $R^5$ and $R^6$, each of which may be the same or different, each represents alkyl, aryl, alkaryl or $R^5$ and $R^6$, taken together, represent a divalent aliphatic group of 4 to 5 atoms which jointly with the amino nitrogen form a five to six membered heterocyclic amino group;

R⁷ represents H, methyl or ethyl;

X represents the anion of a quaternary ammonium group; and $n$ represents an integer, including 0, of from 0 to about 10; heating the thus obtained mixture to a temperature of about 25° to about 110° C. to effect reaction between the hydroxyl group of said quaternized tertiary amino alcohol and some of the free isocyanate groups to form a carbamyl ester; whereby a self emulsifiable polyurethane prepolymer is obtained.

2. The self emulsifiable polyurethane prepolymer produced by the process defined in claim 1.

3. The process as defined in claim 1, wherein the quaternized tertiary amino alcohol is incorporated into the reaction mixture prior to completion of the formation of the prepolymer and is reacted with some of the free isocyanate groups during the course of the formation of the prepolymer.

4. The self emulsifiable polyurethane prepolymer produced by the process defined in claim 1.

5. The process as defined in claim 1, wherein the quaternized tertiary amino alcohol is incorporated into the reaction mixture after completion of the formation of a prepolymer and the reaction thereof with some of the free isocyanate groups is thereafter effected by heating, while still under anhydrous conditions, the thus obtained mixture to a temperature of about 25° to about 110° C. to effect reaction between the hydroxyl group of said quaternized tertiary amino alcohol and some of the free isocyanate groups to form a carbamyl ester to thereby produce a self emulsifiable polyurethane prepolymer.

6. The self emulsifiable polyurethane prepolymer produced by the process defined in claim 5.

7. The process as defined in claim 1 wherein the polyisocyanate specified is a diisocyanate and the polyol specified is a diol.

8. The self emulsifiable polyurethane prepolymer produced by the process defined in claim 7.

9. The process as defined in claim 7 wherein the polyol specific is a polyether diol.

10. The self emulsifiable polyurethane prepolymer produced by the process defined in claim 9.

11. The process as defined in claim 7 wherein the diisocyanate specified is toluene diisocyanate.

12. The self emulsifiable polyurethane prepolymer produced by the process defined in claim 11.

13. The process as defined in claim 11 wherein the quaternized tertiary amino alcohol specified is the methyl chloride quaternary of an N,N dilower alkyl tertiary amino aliphatic alcohol.

14. The self emulsifiable polyurethane prepolymer produced by the process defined in claim 13.

15. The process as defined in claim 13 wherein the quaternized tertiary amino alcohol specified is the methyl chloride quaternary of diethylaminoethoxyethanol.

16. The self emulsifiable polyurethane prepolymer produced by the process defined in claim 15.

17. The process as defined in claim 1 wherein the polyisocyanate specified is a diisocyanate and the polyol specified is a polyester polyol.

18. The self emulsifiable polyurethane prepolymer produced by the process defined in claim 17.

19. The process as defined in claim 17 wherein the polyol specified is a polyester diol.

20. The self emulsifiable polyurethane prepolymer produced by the process defined in claim 19.

21. The process as defined in claim 7 wherein the diisocyanate specified is a cyclohexyl diisocyanate.

22. The self emulsifiable polyurethane prepolymer produced by the process defined in claim 21.

23. The process as defined in claim 21 wherein the quaternized tertiary amino alcohol specified is the methyl chloride quaternary of an N,N-di lower alkyl tertiary amino aliphatic alcohol.

24. The self emulsifiable polyurethane prepolymer produced by the process defined in claim 23.

25. The process as defined in claim 23 wherein the quaternized tertiary amino alcohol specified is the methyl chloride quaternary of diethylaminoethoxyethanol.

26. The self emulsifiable polyurethane prepolymer produced by the process defined in claim 25.

27. The process of producing a stable fully polymerized polyurethane latex which comprises; diluting the emulsifiable polyurethane prepolymer defined in claim 2 with at least one-third its weight of a volatile inert solvent therefor, rapidly mixing the thus diluted prepolymer with water to thereby form an emulsion and effecting chain extension of said prepolymer in said emulsion in the presence of from zero to the theoretically required amount for complete chain extension of a chain extending diamine and in the presence of from zero to an effective catalytic amount of a chain extending catalyst to thereby produce a stable fully polymerized polyurethane latex.

28. The stable fully polymerized polyurethane latex produced by the process defined in claim 27.

29. The process as defined in claim 27 wherein the quaternized tertiary amino alcohol is incorporated into the reaction mixture prior to completion of the formation of the prepolymer and is reacted with some of the free isocyanate groups during the course of the formation of the prepolymer.

30. The stable fully polymerized polyurethane latex produced by the process defined in claim 29.

31. The process as defined in claim 27 wherein the quaternized tertiary amino alcohol is incorporated into the reaction mixture after completion of the formation of a prepolymer and the reaction thereof with some of the free isocyanate groups is thereafter effected by heating, while still under anhydrous conditions, the thus obtained mixture to a temperature of about 25° to about 110° C. to effect reaction between the hydroxyl group of said quaternized tertiary amino alcohol and some of the free isocyanate groups to form a carbamyl ester to thereby produce a self emulsifiable polyurethane prepolymer.

32. The stable fully polymerized polyurethane latex produced by the process defined in claim 31.

33. The process as defined in claim 27 wherein the polyisocyanate employed in producing the prepolymer is a diisocyanate and the polyol so employed is a diol.

34. The stable fully polymerized polyurethane latex produced by the process defined in claim 33.

35. The process as defined in claim 33 wherein the polyol specified is a polyether diol.

36. The stable fully polymerized polyurethane latex produced by the process defined in claim 35.

37. The process as defined in claim 33 wherein the diisocyanate specified is toluene diisocyanate.

38. The stable fully polymerized polyurethane latex produced by the process defined in claim 37.

39. The process as defined in claim 37 wherein the quaternized tertiary amino alcohol employed in producing the prepolymer is the methyl chloride quaternary of an N,N di-lower alkyl tertiary amino aliphatic alcohol.

40. The stable fully polymerized polyurethane latex produced by the process defined in claim 39.

41. The process as defined in claim 39 wherein the quaternized tertiary amino alcohol specified is the methyl chloride quaternary of diethylaminoethoxyethanol.

42. The stable fully polymerized polyurethane latex produced by the process defined in claim 41.

43. The process as defined in claim 27 wherein the polyisocyanate employed in producing the prepolymer is a diisocyanate and the polyol so employed is a polyester polyol.

44. The stable fully polymerized polyurethane latex produced by the process defined in claim 43.

45. The process as defined in claim 43 wherein the polyol specified is a polyester diol.

46. The stable fully polymerized polyurethane latex produced by the process defined in claim 45.

47. The process as defined in claim 33 wherein the diisocyanate specified is a cyclohexyl diisocyanate.

48. The stable fully polymerized polyurethane latex produced by the process defined in claim 47.

49. The process as defined in claim 47 wherein the quaternized tertiary amino alcohol employed in producing the prepolymer is the methyl chloride quaternary of an N,N di-lower alkyl tertiary amino aliphatic alcohol.

50. The stable fully polymerized polyurethane latex produced by the process defined in claim 49.

51. The process as defined in claim 49 wherein the quaternized tertiary amino alcohol specified is the methyl chloride quaternary of diethylaminoethoxyethanol.

52. The stable fully polymerized polyurethane latex produced by the process defined in claim 51.

* * * * *

UNITED STATES PATENT AND TRADEMARK OFFICE
CERTIFICATE OF CORRECTION

PATENT NO. : 4,110,286
DATED : Aug. 29, 1978
INVENTOR(S) : Jan E. Vandegaer and John W. Calentine It is certified that error appears in the above-identified patent and that said Letters Patent are hereby corrected as shown below:

Column 1, line 25: "fluid" should read -- field --. Column 6, line 67: "present" should read -- presence --. Column 7, line 41: "and" should read -- an --. Column 7, line 58: that portion of the formula to the right of the arrow in Eq. 2 reading "$(O-CH-CH_2)_n$" should read -- $(O-CH-CH_2)_n$ --.
$R^7$ $R^7$ Column 8, line 55: that portion of the second line of Formula 6 reading "$(O-CH-CH_2)_n$" should read -- $(O-CH-CH_2)_n$ --. Column 8, line 61: "$F^7$" should read -- $R^7$ --. Column 9, line 63 that portion of the formula reading: "$(O-CH-CH_2)_n$" should read -- $(O-CH-CH_2)_n$ --. Column 9, line 66: "$R^6$ and" should read -- $R^6, R^7$ and --. Column 11, line 55: "terminal isocyanate isocyanate group" should read -- terminal isocyanate group --. Column 11, line 55; that portion of the formula, at the right thereof, reading "$-\overset{+}{N}\overset{Cl^-C_2H_5}{\underset{CH_3C_2H_5}{}}$" should read -- $-\overset{+}{N}\overset{Cl^-C_2H_5}{\underset{CH_3C_2H_5}{}}$ --.

Signed and Sealed this

Eleventh Day of September 1979

[SEAL]

Attest:

Attesting Officer

LUTRELLE F. PARKER
Acting Commissioner of Patents and Trademarks